US006947512B1

(12) United States Patent
Shinoda et al.

(10) Patent No.: US 6,947,512 B1
(45) Date of Patent: Sep. 20, 2005

(54) CARRIER REPRODUCING CIRCUIT (75) Inventors: Atsushi Shinoda, Sagamihara (JP); Kenichi Shiraishi, Yokohama (JP)

(73) Assignee: Kabushiki Kaisha Kenwood, Tokyo (JP)

( * ) Notice: Subject to any disclaimer, the term of this patent is extended or adjusted under 35 U.S.C. 154(b) by 0 days.

(21) Appl. No.: 09/763,958

(22) PCT Filed: Aug. 26, 1999

(86) PCT No.: PCT/JP99/04614

§ 371 (c)(1),
(2), (4) Date: Feb. 28, 2001

(87) PCT Pub. No.: WO00/13385

PCT Pub. Date: Mar. 9, 2000

(30) Foreign Application Priority Data

Aug. 31, 1998 (JP) .................................. 10-259128

(51) Int. Cl.[7] ............................................. H04L 25/40
(52) U.S. Cl. .................................................... 375/371
(58) Field of Search ............................... 375/324–327, 375/354, 362, 371

(56) References Cited

U.S. PATENT DOCUMENTS 5,809,009 A * 9/1998 Matsuoka et al. .......... 370/206
6,490,010 B1   12/2002 Shibuya et al.

FOREIGN PATENT DOCUMENTS

| EP | 0 940 957 A1 | 9/1999 |
|----|--------------|--------|
| JP | 08-207408 | 8/1996 |
| JP | 09-186730 | 7/1997 |
| JP | 09-199997 | 7/1997 |
| JP | 09-321813 | 12/1997 |
| JP | 10-215291 | 8/1998 |
| JP | 11-098432 | 4/1999 |
| WO | WO99/14914 | 3/1999 |

OTHER PUBLICATIONS

International Search Report.
Office Letter, Notification of Refusal Reason, JP H10-259128, Japanese Patent Office.

* cited by examiner

Primary Examiner—Tesfaldet Bocure
Assistant Examiner—Pankaj Kumar
(74) Attorney, Agent, or Firm—Eric J. Robinson; Robinson Intellectual Property Law Office, P.C.

(57) ABSTRACT

A carrier reproducing circuit capable of judging the polarity of alienation frequency. A TMCC section is detected from the synchronous detection output from a synchronous detection circuit (1) by a TMCC section detecting circuit (4), the synchronous detection output is converted to a signal point arrangement by a signal point arrangement converting circuit (5), the phase of the converted signal point position signal is rotated at a predetermined angular velocity for each symbol of the TMCC by a phase rotating circuit (8), the signal position signal whose phase is rotated is phase-detected by a phase detector (6), an auto-correlation function of the phase detection output in the TMCC section is determined by an auto-correlation function determining circuit (7) and angular velocity information based on the period of the waveform of the determined auto-correlation function is obtained, the phase-rotation angular velocity at the phase rotation circuit (8) is subtracted from the obtained angular velocity by a subtracting circuit (9), and sine and cosine wave data on frequency based on the output of the subtraction are generated and sent to the phase detection circuit (1) by a numerical control oscillator (2).

9 Claims, 6 Drawing Sheets

(PRIOR ART)

CARRIER REPRODUCING CIRCUIT

TECHNICAL FIELD

The present invention relates to carrier reproduction for a BS digital broadcasting receiver, and moreover in particular, relates to a method of implementing carrier reproduction to create reproducing carrier signals with auto-correlation function and a circuit thereof.

BACKGROUND ART

Figure 5:
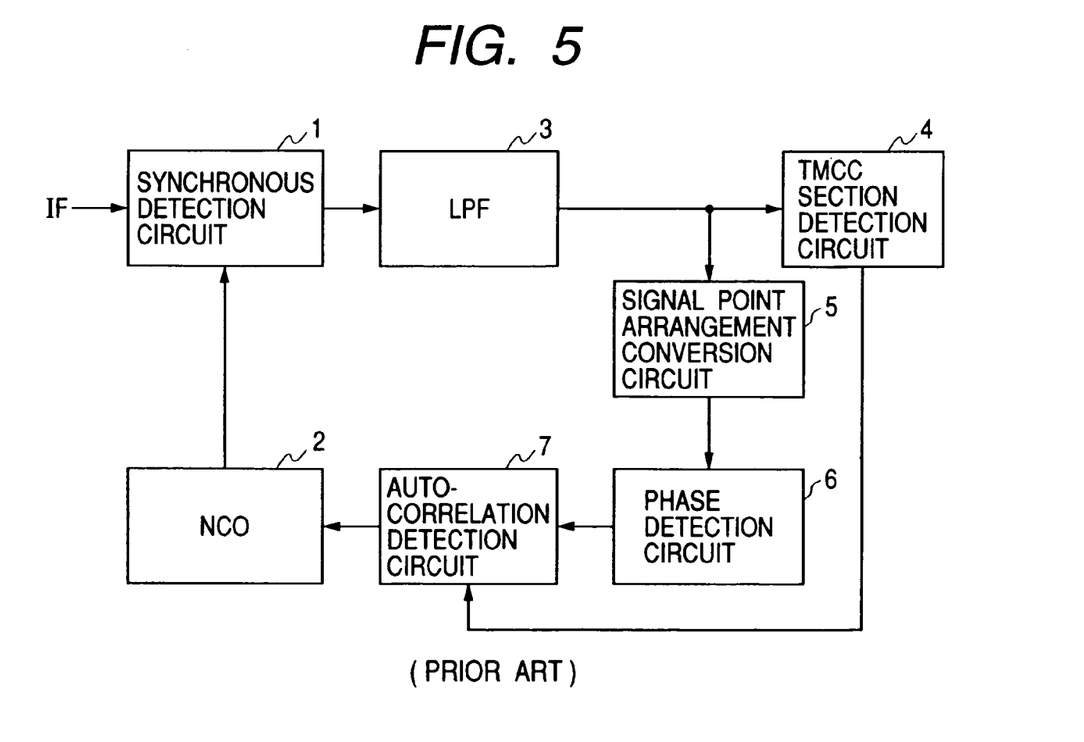
FIG. 5 is a block diagram showing the configuration of a prior art carrier reproducing circuit.

A BS digital broadcasting receiver includes a synchronous detection circuit for detecting PSK modulated waves, and in order to create reproducing carrier signals synchronized with reception signal carriers to be used for synchronous detection, implements carrier reproduction with auto-correlation function. A prior art carrier reproducing circuit is configured as shown in FIG. 5.

A PSK modulated signal which was converted to comprise a medium frequency is supplied to two multipliers respectively which configure the synchronous detection circuit 1 and are multiplied by cosine wave data and sine wave data with a multiplier and undergoes synchronous detection. Multiplication output I data as well as Q data outputted from the synchronous detection circuit 1 are supplied to two digital low pass filters respectively which configure a digital low pass filter 3 and the high digit frequency components which are being respectively outputted from the synchronous detection circuit 1 are removed so that the I data as well as the Q data being baseband signals are sent out.

Figure 6:
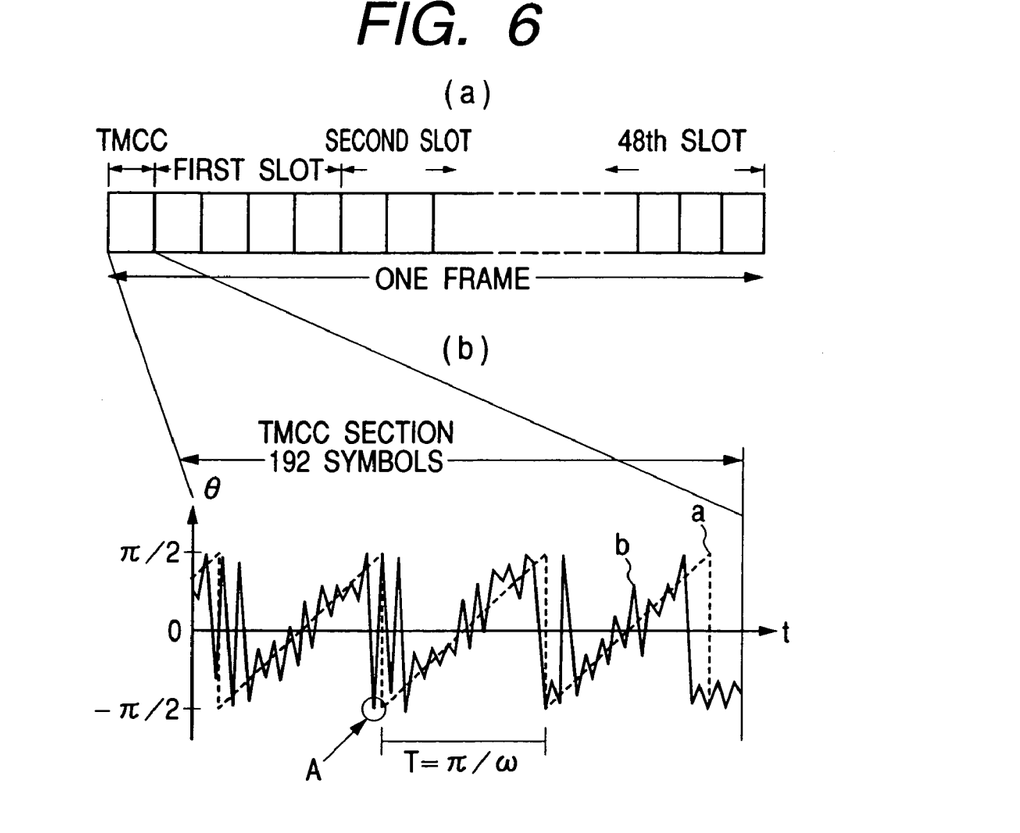

An output baseband signal from the digital low pass filter 3 includes as shown in FIG. 6 a first to a forty-eighth slots transmitting a TMCC section as well as information to the head of one frame. A TMCC is a Transmission and Multiplexing Configuration Control signal and transmits slot number information to designate transmission method (designate modulation method or error correction code substituting ratio) as well as to control time slots so as to correctly decode bit information at the phase point of demodulation with the TMCC information. A TMCC section is a period of time during when the TMCC signal is sent. The I data as well as the Q data are supplied to the Transmission and Multiplexing Configuration Control signal (TMCC) section detecting circuit 4 so that the TMCC section is detected in the TMCC section detecting circuit 4 and the signal showing the TMCC section width (192 symbols) is outputted.

On the other hand, the I data as well as the Q data being baseband signals outputted from the digital low pass filter 3 are supplied to a signal point arrangement converting circuit 5 and are converted into a signal point position signal based on the I data as well as the Q data being output base band signals from the digital low pass filter 3. The signal point position signal subject to conversion in the signal point arrangement converting circuit 5 is supplied to a phase detector 6 and undergoes phase detection.

The phase detection output from the phase detector 6 is supplied to the auto-correlation function determining circuit 7 together with the above described TMCC section width signal so that the auto-correlation function is obtained over the TMCC section width from the phase detection output and the delayed phase detection output subject to delay for time τ on the phase detection output. A signal based on the period of the obtained auto-correlation function wave-form represents a shift of the oscillation frequency of the NCO 2 from the carrier frequency, and this signal is supplied to the numerical control oscillator (NCO) 2 from the auto-correlation function determining circuit 7. In the NCO 2, the signal based on the period of the auto-correlation function wave-form outputs cosine wave data as well as sine wave data of the reproducing carrier signal having the frequency synchronized with the carrier from the NCO 2 which are supplied to the multiplier of the synchronous detection circuit 1 and are multiplied by the I data as well as the Q data so that carrier reproduction is implemented.

Here, as described above, involvement of method to detect the auto-correlation in the carrier reproducing circuit is known to be strong against noises.

The frame configuration of the BS digital broadcast has as shown in FIG. 6(a) at its head following a frame synchronization (not shown) the header information modulated with BPSK called TMCC and the TMCC section is formed with 192 symbols.

Here in the case where the oscillation frequency in the NCO is shifted from the carrier frequency, the phase detection output of the TMCC signal in the TMCC section will become a sawtooth wave a as shown with broken lines in FIG. 6(b). When the C/N is sufficiently high, a beautiful sawtooth wave as shown with broken lines a is reproduced. In addition, since the period of this sawtooth wave represents a shift frequency of the oscillation frequency of the NCO 2, the differential coefficient as well as the period of the sawtooth wave a can be measured directly. However, when C/N is low, signals based on noises are multiplexed onto the sawtooth wave a due to noises to give rise to the one shown in the solid line wave-form b in FIG. 6(b), and as for differential coefficient as well as period, it will become impossible to measure its period T directly from the wave-form b.

Figure 7:
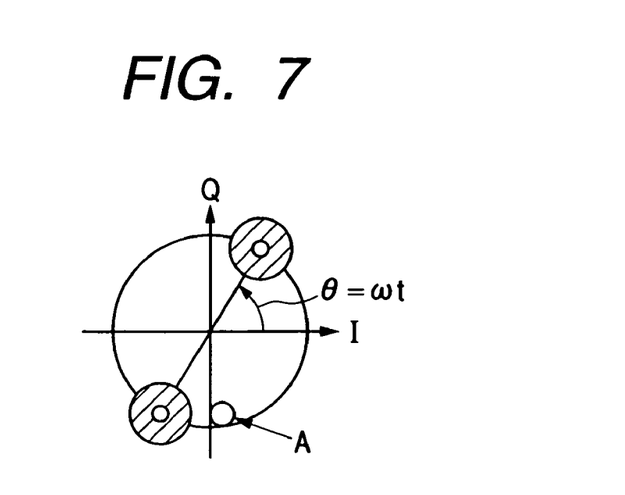
FIG. 7 is a model view showing constellation of a signal point position signal.

Especially, when the phase of the signal point position signal is near 90 degrees, for example, in the case of position designated with A in FIG. 6(b) and FIG. 5, the detection phase will exceed 90 degrees even with a tiny noise component, but since a signal exceeding +90 degrees is detected as −90 degrees, an enormously large detection error will be given rise to. FIG. 7 shows constellation of a signal point position signal and the oblique line portion shows an uneven range of the signal point position signal.

Therefore, a signal wave-form b including noises is not directly measured to measure oscillation frequency shift of the NCO 2, but with auto-correlation function, noises are reduced. In the case where the input signal is a period function, the auto-correlation function will become a period function with the same period. Since this auto-correlation function is a signal processing which is strong against noises, the period of the input signal can be correctly obtained from this auto-correlation function also in the case where noises exist. Accordingly, the phase detection output of the wave-form b in FIG. 6(b) will not be measured for its period directly, but the auto-correlation function is obtained and the period of its wave-form is measured.

Figure 8:
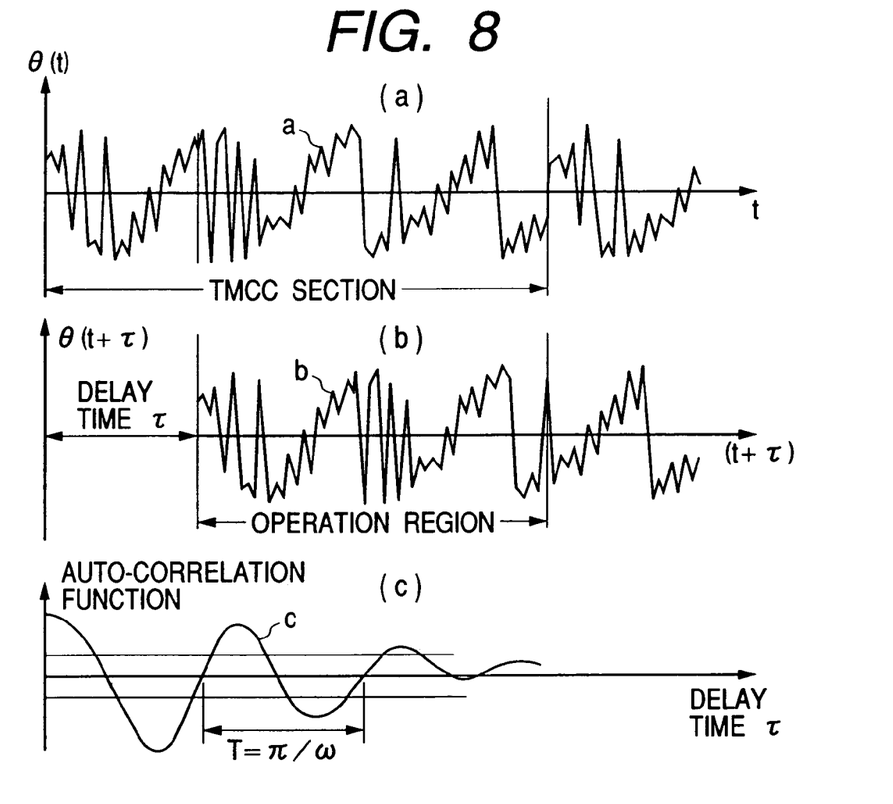

FIG. 8 is an explanatory view of calculation of an auto-correlation function as well as of its wave-form. The phase detection output wave-form from the phase detector 6 is as shown in FIG. 8(a), where the wave-form b in FIG. 6(b) was redescribed to be represented by θ(t), and FIG. 8(b) shows wave-form θ(t+τ) subject to delay time τ from the wave-form in FIG. 8(a), where auto-correlation function Φ(τ) is calculated over the balance section by subtracting the delay time τ from the TMCC section detected by the TMCC section detecting circuit 4. In FIG. 8(b), it is described as an arithmetic operation section. The auto-correlation function $\Phi(\tau)$ is expressed in an equation to become the one shown in the following equation (1):

$$\Phi(\tau)=\Sigma\{\theta(t)-\theta ave\}\{\theta(t+\tau)-\theta ave\} \qquad (1)$$

In the equation (1), θ(t) denotes a phase detection output with an adding section being an arithmetic operation section from 0 to (M−1−τ). Here, reference character M denotes a symbol number of an observation section, that is, a symbol number of a TMCC section, and in the BS digital broadcast the symbol number of the TMCC section is 192. θave denotes an average value within the observation section of the phase detection output. The operated auto-correlation function is shown in FIG. 8(c). In a portion of a predetermined amplitude level of this auto-correlation function, zero cross of the auto-correlation function $\Phi(\tau)$ wave-form is obtained to obtain an average period T.

An average period T is the average period T=π/ω, wherein ω is an angular velocity of alienation frequency, and here the alienation frequency ω denotes a shift between the oscillation frequency (reproducing carrier frequency) of NCO 2 and the carrier frequency. An alienation frequency is also described as a shift frequency. The angular velocity ω is obtained from the average period T and is supplied to the NCO 2 so as to give rise to a sine wave and a cosine wave of the angular velocity ω in the NCO 2 to be sent out to the synchronous detection circuit 1 so that carrier reproduction is implemented.

However, with the above described prior art carrier reproducing circuit, there is a problem that the direction of frequency shift, that is, polarity cannot be detected. That is, with this method of obtaining an auto-correlation function, for any of shift of oscillation frequency of the NCO 2 from the carrier which could be +Δω or −Δω, wave-forms of the auto-correlation function being an output of the auto-correlation circuit 7 is the same, and therefore alienation frequency is required to undergo polarity judgment, but polarity judgment cannot be implemented.

In order to avoid the issue of polarity judgment on the alienation frequency, there is a possibility that the oscillation frequency of the NCO 2 is shifted in advance to the initial state at the time of synchronous detection. With the frequency for shifting being made to be α, if this α is set at a value not less than the expected maximum alienation frequency of the NCO 2, then for the alienation frequency ω not more than that, the direction of polarity is determined to one. That is, as shown in FIG. 9(a), with the reproducing carrier frequency of the phase detection output being set at the center of the expected maximum alienation frequency range of the NCO 2, polarity judgment cannot be implemented.

Figure 9:
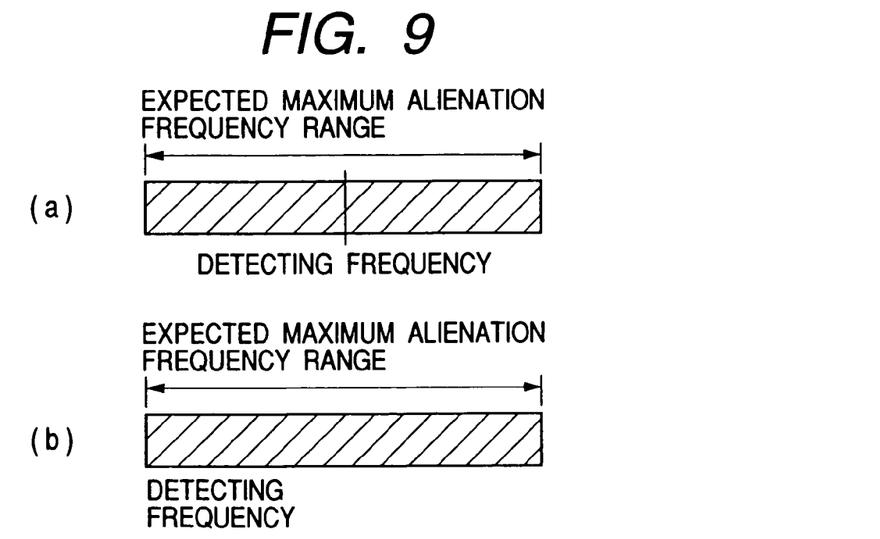

Nevertheless, as shown in FIG. 9(b), with the reproducing carrier frequency being set at the minimum frequency of the expected maximum alienation frequency range of the NCO 2, polarity being negative will not take place (, that is, the oscillation frequency of the NCO 2 is always higher than the reproducing carrier frequency), the polarity is positive, and in this relation, it will not take place that polarity judgment cannot be implemented. However, the range in which the TMCC section is detected is the expected maximum alienation frequency range shown in FIG. 9(a) with the reproducing carrier frequency at the center, and therefore, direct application of this method to a carrier reproducing circuit in a BS digital broadcasting receiver will give rise to a problem that a portion where any TMCC section cannot be detected or in this example a crosshatched portion in the rightward half from the dotted line in FIG. 9(b) will be generated.

Accordingly, since the auto-correlation function at the time of carrier reproducing in a BS digital broadcasting receiver is operated based on the TMCC section, an indispensable condition is that the TMCC section can be detected, and when no TMCC section will become detectable, no auto-correlation function will be given by operation.

As another problem different from the polarity judgment of alienation frequency, when the alienation frequency Δω becomes too much small, the period of auto-correlation function T=π/ω will increase, giving rise to a problem that one period of auto-correlation function will not be contained within a TMCC section at a constant period and the period T cannot be obtained so that carrier reproduction cannot be implemented.

Objects of the present invention are to provide a carrier reproducing circuit capable of judging the polarity of alienation frequency in a carrier reproducing circuit using auto-correlation function to implement carrier reproduction, and to solve the problem that carrier reproduction cannot be implemented when alienation frequency is small.

SUMMARY OF THE INVENTION

A carrier reproducing method of a PSK modulated signal according to the present invention comprises steps of synchronously detecting the PSK modulated signals with a reproducing carrier signal from an oscillator to create a synchronous detecting signal, phase-detecting the above described synchronous detecting signal to create a phase detecting signal, creating an auto-correlation function outputs taken over a predetermined time interval (TMCC period) on the above described phase detecting signal, applying a control signal based on a period of the above described auto-correlation function output to the above described oscillator to make reproducing control signal from said oscillator synchronize with carrier of the PSK modulated signal, characterized in that a phase rotation of a predetermined angular velocity (α) is given to the above described phase detecting signal so that on the phase detecting signal to which the above described phase rotation is given, the auto-correlation function output taken over the above described predetermined time interval is created.

A carrier reproducing circuit of PSK according to the present invention is a circuit comprising an oscillator (NCO) for outputting a reproducing carrier signal, a synchronous detection circuits (1, 3) for synchronously detecting a reception PSK modulated signal with the above described reproducing carrier signal to create I, Q signals, a signal point arrangement converting circuit (5) for implementing a signal point arrangement conversion on the above described I, Q signals to create a signal point arrangement conversion signal, a phase detecting circuit (6) for phase-detecting the above described signal point arrangement conversion signals to create phase detecting signals, and an auto-correlation detection circuit (7) for taking an auto-correlation over a predetermined time interval on the above described phase detecting signals to produce an auto-correlation function output and for giving to the above described oscillator a signal based on the auto-correlation function output to control an oscillation frequency of the above described oscillator, characterized by a phase rotation circuit (8) for causing the above described phase detecting signal to phase-rotate by a predetermined angular velocity (α).

Accordingly, according to the present invention, instead of making frequencies of the sine wave data as well as the cosine wave data shift in order to judge polarity of frequency shift, the phase detecting signal is caused to phase-rotate to compensate this phase-rotating portion and the oscillation frequency of a numerical control oscillator is controlled, and therefore the numerically controlled oscillation frequency is not shifted, and a signal for transmission multiplexed configuration control signal section detection is not phase-rotated, and therefore the TMCC sections are always detected so that the auto-correlation can be obtained and polarity judgment on frequency shift will become feasible.

BRIEF DESCRIPTION OF THE DRAWINGS

FIGS. 2(a)–(d) are explanatory views showing the operation of a carrier reproducing circuit according to an embodiment of the present invention;

FIGS. 3(a)–(d) are explanatory views showing the operation of a carrier reproducing circuit according to an embodiment of the present invention;

FIGS. 4(a) and (b) are explanatory views showing the operation of a carrier reproducing circuit according to an embodiment of the present invention;

FIGS. 6(a) and (b) are model wave-forms graph showing outputs of a phase detecting circuit;

FIGS. 8(a)–(c) are explanatory views showing calculation of an auto-correlation function as well as wave-forms thereof; and FIGS. 9(a) and (b) are explanatory views to be served to explain the operation of a prior art carrier reproducing circuit.

DETAILED DESCRIPTION OF THE PREFERRED EMBODIMENTS

A carrier reproducing circuit according to the present invention will be described by way of an embodiment as follows.

Figure 1:
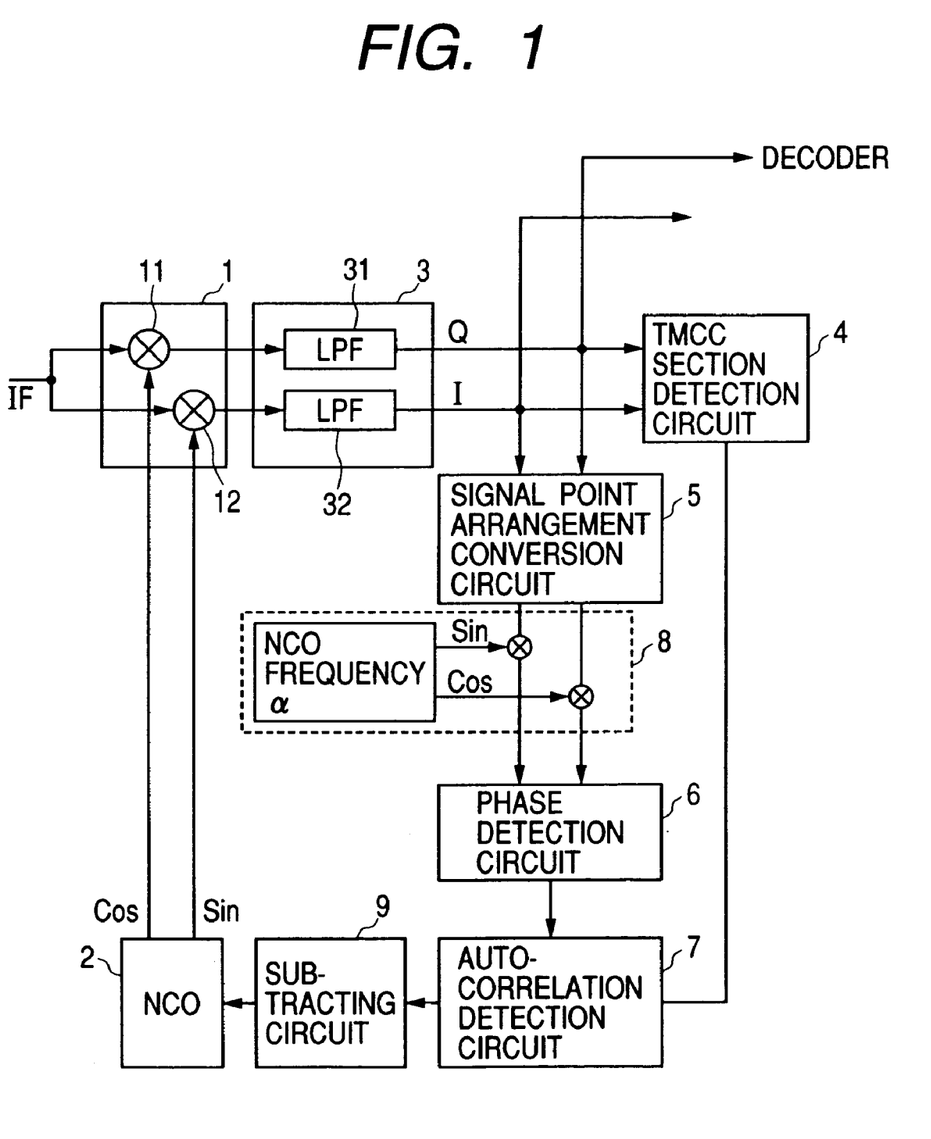
FIG. 1 is a block diagram showing the configuration of a carrier reproducing circuit according to an embodiment of the present invention.

FIG. 1 is a block diagram showing a configuration of a carrier reproducing circuit according to an embodiment of the present invention.

In the carrier reproducing circuit according to an embodiment of the present invention, PSK modulated signals having been converted to a medium frequency is respectively supplied to a multiplier 11 and a multiplier 12 configuring a synchronous detection circuit 1, multiplied by cosine data and sine data in the multiplier 11 and the multiplier 12 and synchronously detected by I data and Q data being baseband signals. The multiplier output I data and Q data outputted from the synchronous detection circuit 1 are respectively supplied to a digital low pass filter 31 and a digital low pass filter 32 configuring a digital low pass filter 3 so that a high digit frequency component in respective outputs from the synchronous detection circuit 1 are removed and the I data as well as Q data being baseband signals are sent out.

The I data as well as the Q data being output baseband signals from the digital low pass filter 3 are supplied to a decoder for demodulating information portions and are supplied to the section detecting circuit 4 so that TMCC sections are detected in a TMCC section detecting circuit 4 and signals having width of the TMCC section is sent out to the auto-correlation function determining circuit 7.

On the other hand, outputs from the digital low pass filters 31 and 32 are supplied to a signal point arrangement converting circuit and are converted into signal point position signals based on the I data and the Q data being output baseband signals from the digital low pass filters 31 and 32. A signal point position signal converted in the signal point arrangement converting circuit 5 is substantially a vector up to a signal point position. This signal point position signal is supplied to the phase rotation circuit 8 so that the signal point position signal is caused to phase-rotate at a predetermined angular velocity α determined in advance for each symbol in a TMCC section. Phase rotation is implemented by sine and cosine signals of an angular velocity a being multiplied respectively by the I and the Q signals. The signal point position signals subject to phase rotation are supplied to a phase detector 6 and undergo phase detection.

Here, a predetermined angular velocity a determined in advance for each symbol is determined based on a expected oscillation frequency range of NCO 2, and with a large expected oscillation frequency range, the angular velocity α is set with a fast value.

The phase detection output from the phase detector 6 is supplied to the auto-correlation function determining circuit 7 so that an auto-correlation function $\Phi(\tau)$ is obtained from the phase detection output and a delayed phase detection output subject to a delay by time $\tau$ from the phase detection output. Once a period T of the obtained auto-correlation function wave-form is obtained and the alienation frequency at the time when synchronous operation of the NCO 2 starts is represented by ω, an angular velocity (ω+α) is obtained from relationship of the period T=π/(ω+α). Here, the angular velocity (ω+α) is adopted since phase rotation is caused to take place at an angular velocity a with the phase rotation circuit 8.

The angular velocity α, which has been caused to phase-rotate from the obtained angular velocity (ω+α) with the phase rotation circuit 8, is subtracted in the subtracting circuit 9, and the output from the subtracting circuit 9 is supplied to the NCO 2 as a control voltage having polarity corresponding with the size of the alienation frequency ω. In the NCO 2, the control voltage is fed back so that the alienation frequency ω becomes 0, and as a result hereof, cosine wave data cos as well as sine wave data sin of reproducing carrier signals synchronized with carriers is outputted and is respectively supplied to the multiplier 11 and the multiplier 12 of the synchronous detection circuit 1 to be multiplied by the I data and the Q data.

Here, in the carrier reproducing circuit according to an embodiment of the present invention, instead of causing the oscillation frequency of the NCO 2 to shift in order to implement polarity judgment on the alienation frequency ω calculated with the auto-correlation function determining circuit 7, that is, polarity judgment of frequency shift, the signal point position signals are caused to phase-rotate with the phase rotation circuit 8, but as for I and Q signals inputted into a TMCC section detecting circuit 4, they are not caused to phase-rotate. Accordingly, this phase rotation does not influence detection of the TMCC section in the TMCC section detecting circuit 4.

By implementing phase rotation at the angular velocity α with the phase rotation circuit 8, a phase detection output of the phase detector 6 is also caused to phase-rotate at an angular velocity equivalent to α, and is caused to change at an angular velocity equivalent to α to be outputted from the auto-correlation function determining circuit 7. The phase rotation by the angular velocity a in the phase rotation circuit 8 will be imitatively given the same setting as in case of shifting the phase detecting frequency to the one end side in the expected alienation frequency range as shown in FIG. 9(b). Thereby, polarity judgment of the alienation frequency will be able to be implemented. Moreover, the angular velocity α, which was added by the phase rotation circuit 8 from the angular velocity (ω+α) outputted from the auto-correlation function determining circuit 7, has been supplied to the NCO 2 to be subtracted with the subtracting circuit 9, and the oscillation frequency itself of the NCO 2 is not shifted in advance, and therefore detection in the TMCC section will not be influenced anyhow. Incidentally, the NCO may be a voltage control oscillator (VCO).

Figure 2:
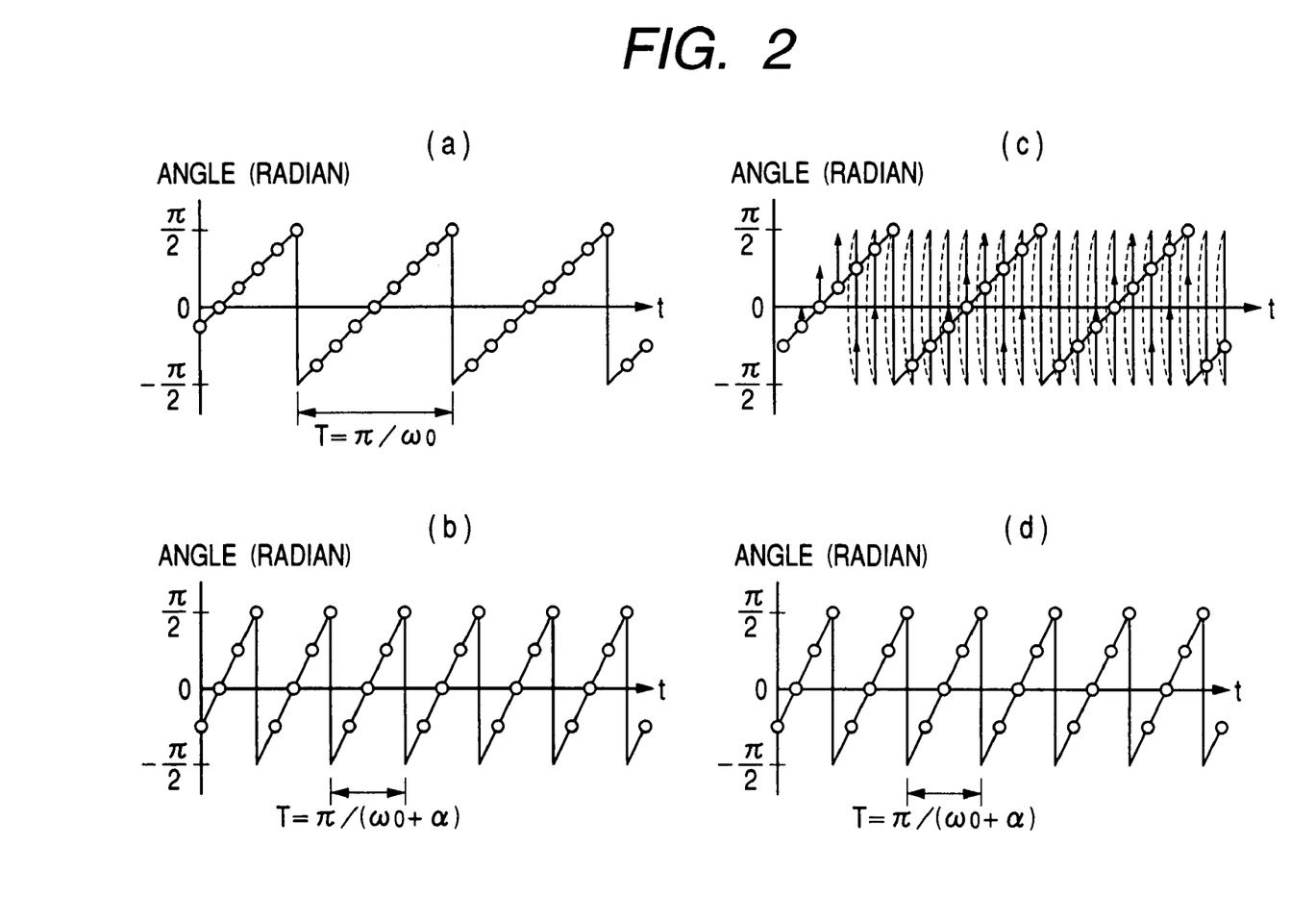
Figure 3:
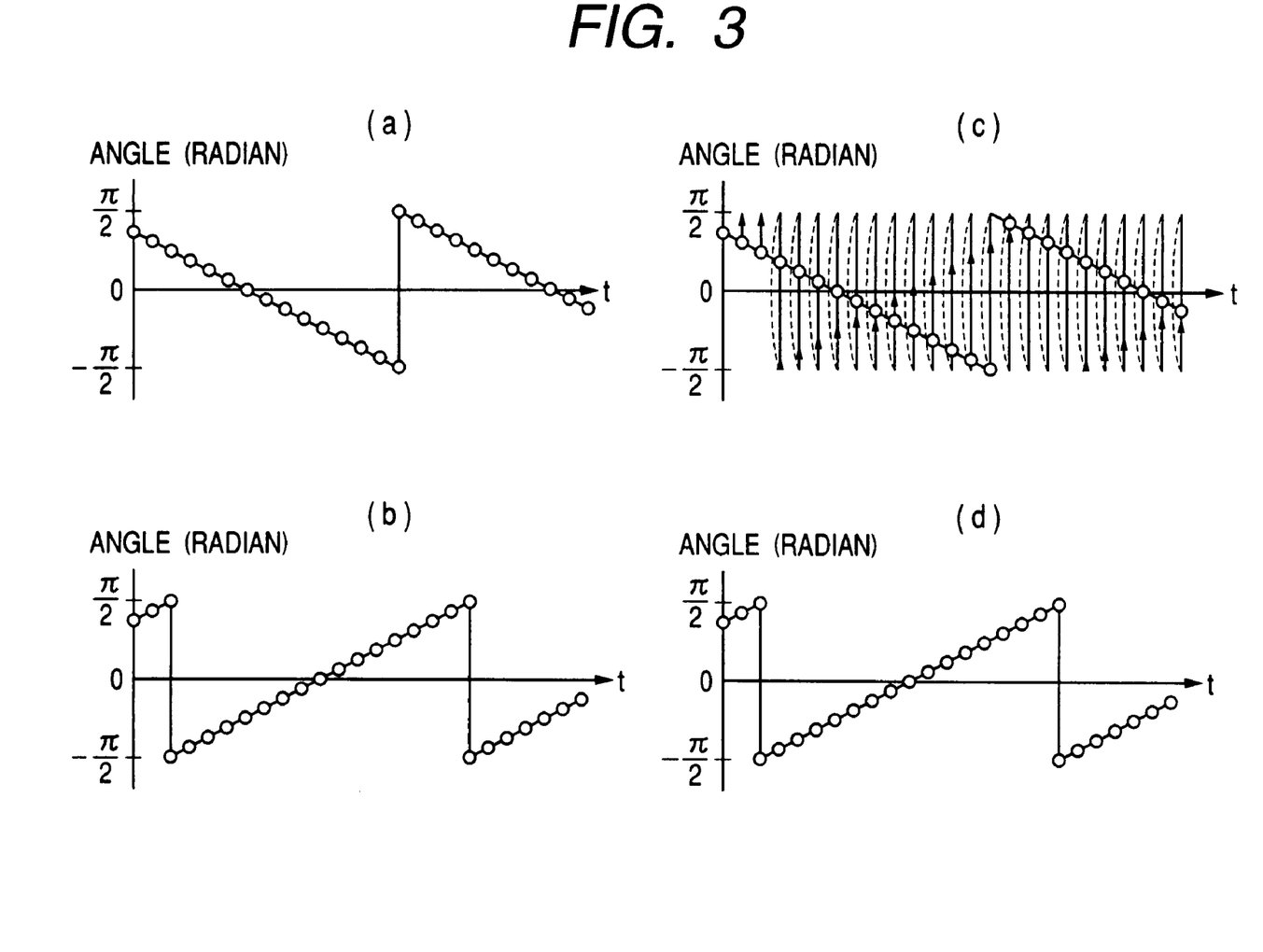

This polarity judgment would be described further as follows. With carrier frequency being ωc and oscillation frequency (reproducing carrier frequency) of the NCO 2 being ωn, in the case of ωc>ωn, phase detection outputs from the phase detector 6 without phase rotation α with alienation frequency being +ω0 are shown in FIG. 2(a). In FIG. 2 as well as in FIG. 3 to be described later, circular points represent symbol positions and inclination between the adjacent symbols is the alienation angular frequency ω0. Phase detection outputs when the phase detection outputs are caused to phase-rotate in the positive direction at an angular velocity +α are as shown in FIG. 2(b), and inclination between symbols will be (ω0+α). Since +ω0 has the same polarity as +α, (ω0+α) is larger than α. Accordingly, (ω0+α)−α being an output of the subtracting circuit 9 has positive polarity.

FIG. 2(c) further shows how it looks like when phase rotation is caused to take place at an angular velocity α for a symbol, wherein arrows show how it looks when phase rotation is caused to take place at an angular velocity α for each symbol while broken lines show how it looks like when returning is taking place in excess of π/2 radian. FIG. 2(d) shows phase detection output of the phase detector 6 corresponding with FIG. 2(c).

With the alienation angular frequency being −ω1 at the time of ωc<ωn, the phase detection outputs from the phase detector 6 are shown in FIG. 3(a). The phase detection outputs at the time when the phase detection outputs are caused to phase-rotate at an angular velocity +α are as shown in FIG. 3(b), where inclination between symbols will become (−ω1+α) as a result of phase rotation at an angular velocity +α. Since −ω1 and +α are different in polarity, (−ω1+α) is smaller than α. Accordingly, (−ω0+α)−α being an output from the subtracting circuit 9 will have negative polarity. That is, the outputs (−ω0+α) and (−ω1+α) of the auto-correlation detection circuit 7 do not have polarity, but for the outputs of the subtracting circuit 9, polarity appears based on whether the oscillation frequency ωn of the NCO 2 is higher or lower than the carrier frequency ωc.

FIG. 3(c) further shows how it looks like when phase rotation is caused to take place at an angular velocity α for a symbol, wherein arrows show how it looks when phase rotation is caused to take place at an angular velocity α for each symbol while broken lines shown how it looks like when returning is taking place in excess of π/2 radian. FIG. 3(d) shows phase detection output of the phase detector 6 corresponding with FIG. 3(c). Thus, phase rotation at an angular velocity a for a symbol will cause polarity of the phase detection output to be positively converted and will be the same as in the case described in the polarity judgment in FIG. 9(b).

As direction of phase rotation, positive α or negative a can be adopted. Adopting positive angular velocity α, when the reproducing carrier frequency is higher than carrier frequency, that is, positive ω, the phase detection output (ω+α) will have its absolute value becoming larger than ω for a portion equivalent to α, and when it is lower (, that is, negative ω), the phase detection output (ω+α) will have its absolute value becoming smaller than ω for a portion equivalent to α. Adoption of a negative angular velocity α will give rise to a reversed relationship, but it will remain same that alienation frequency of correct polarity will be obtained.

In addition, when (ω+α) approaches zero, T=π(ω+α) will become longer than the width of the TMCC section, and outputs of auto-correlation detection circuit will become unavailable. Accordingly, |α| is selected to be larger than |ω| having ±ω of range width of the expected frequency of the NCO 2 by Δω so that (ω+α) always becomes larger than a predetermined value, for example Δω. Here, Δω is selected so that π/Δω becomes shorter than the width of the TMCC section. For example, with ±ω=±1 MHz, |α|=1.2 MHz will give rise to Δω=0.2 MHz, and the minimum value of frequency of the phase detecting signal (ω+α) is 0.2 MHz. Accordingly, the period will be made to become T=π/0.2×10−6≈15.8 μs<width of TMCC section. With selection of such α, outputs of auto-correlation detection circuit always can be obtained, and outputs of the subtracting circuit gives rise to positive or negative polarity based on the fact that the oscillation frequency of the NCO 2 is either higher or lower than the carrier frequency, and therefore, with the NCO 2 being controlled appropriately, the NCO 2 can output reproducing carriers synchronized with carriers.

Figure 4:
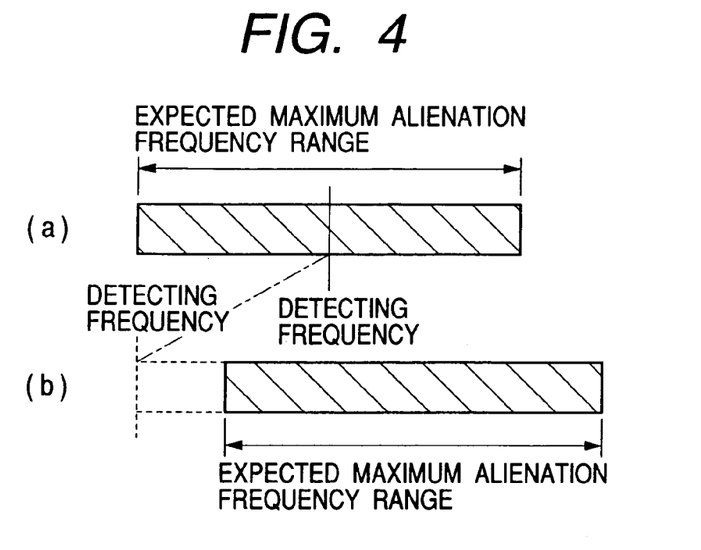

In the present embodiment, the input of the phase detector 6 is phase-rotated with phase rotation by the phase rotation circuit 8, that is, vectors of the baseband signals inputted into the phase detector 6 are phase-rotated for phase detection with the phase detector 6, and therefore the angular velocity α is set so that as shown in FIG. 4(a), the phase detecting frequency is positioned at a frequency exceeding the expected maximum frequency range, that is, the right end in FIG. 4(b) when the expected maximum frequency range was arranged to be positioned at a blank in the frequency rage where carriers do not exist from the phase detecting frequency as shown in FIG. 4(b) from approximately the center of the expected maximum frequency range. Incidentally, the phase rotation may be implemented onto the I and the Q signals inputted into the signal point arrangement converting circuit 5.

Making setting like this, polarity of the alienation frequency will not be negative, substantially enabling polarity of the alienation 110 frequency to be judged. In addition, presence of the blank section makes the alienation frequency too little, and therefore such a case that one period is not contained within a TMCC section and no periods will become obtainable will not take place.

As described above, according to the carrier reproducing circuit of the present invention, causing the vectors of the baseband signals to phase-rotate, and compensating portions of phase rotation after auto-correlation detection, polarity of the alienation frequency always can be judged.

What is claimed is:

1. A carrier reproducing method of a PSK modulated signal, comprising steps of:
   synchronously detecting the PSK modulated signals with a reproducing carrier signal from an oscillator to create a synchronous detecting signal;
   phase-detecting said synchronous detecting signal to create a phase detecting signal;
   creating an auto-correlation function output taken over a predetermined time interval (TMCC period) on said phase detecting signal; and applying a control signal based on a period of said auto-correlation function output to said oscillator to make a reproducing control signal from said oscillator synchronize with a carrier of the PSK modulated signal, characterized in that a phase rotation of a predetermined angular velocity ($\alpha$) which is larger than a maximum expected alienation frequency of said oscillator with respect to a carrier frequency to said phase detecting signal so that on the phase detecting signal to which said phase rotation is given, the auto-correlation function output taken over said predetermined period is created.

2. The carrier reproducing method according to claim 1, characterized in that said synchronous detecting signal is a signal point arrangement conversion signal obtained by multiply-detecting said reproducing carrier signal and the PSK modulated signal to create I, Q signals and implementing a signal point arrangement conversion for said I, Q signals, and the phase rotation of a predetermined angular velocity ($\alpha$) to said phase detecting signal is a phase-rotation of the predetermined angular velocity ($\alpha$) taken for said signal point arrangement conversion signal.

3. The carrier reproducing method according to claim 1 or 2, characterized in that said control signal having a polarity is created from a value derived by subtracting said predetermined angular velocity ($\alpha$) from an angular velocity ($\omega+\alpha$) corresponding with a period of said auto-correlation function.

4. The carrier reproducing method according to claim 1, characterized in that a period (T) corresponding with a difference between said predetermined angular velocity ($\alpha$) and a maximum one of said expected alienation frequency is selected so as to become smaller than a predetermined time interval taking said auto-correlation.

5. The carrier reproducing method according to any one of claim 1, 2 or 4, characterized in that said predetermined angular velocity ($\alpha$) is an $\alpha$ having positive polarity or negative polarity.

6. The carrier reproducing method according to claim 2, characterized in that said I, Q signals are inputted and a predetermined time interval width taking said auto-correlation is determined from said I, Q signals.

7. A synchronous detecting apparatus of a PSK modulated signal, comprising:

an oscillator (NCO) for outputting a reproducing carrier signal;

synchronous detection circuits (1, 3) for synchronously-detecting a reception PSK modulated signal with said reproducing carrier signal to create I, Q signals;

a signal point arrangement converting circuit (5) for implementing a signal point arrangement conversion on said I, Q signals to create a signal point arrangement conversion signal;

a phase detecting circuit (6) for phase-detecting said signal point arrangement conversion signal to create a phase detecting signal; and an auto-correlation detection circuit (7) for taking an auto-correlation over a predetermined time interval on said phase detecting signals to produce an auto-correlation function output, and for giving to said oscillator a signal based on the auto-correlation function output to control an oscillation frequency of said oscillator, characterized by a phase rotation circuit (8) for causing said signal point arrangement signal to phase-rotate by a predetermined angular velocity ($\alpha$) which is larger than a maximum expected alienation frequency of said oscillator with respect to a carrier frequency.

8. The synchronous detecting apparatus according to claim 7, further comprising a subtracting circuit (9) for subtracting a value corresponding with said predetermined angular velocity from a signal based on said auto-correlation function output.

9. The synchronous detecting apparatus according to claim 7 or 8, further comprising a circuit (4) for determining a value of the predetermined time interval taking said auto-correlation, according to said I, Q signals.

* * * * *